INVENTOR
JOHN R. McWHIRTER
BY John C. Le Fever
ATTORNEY

Dec. 15, 1970  J. R. McWHIRTER  3,547,812
HIGH OXYGEN UTILIZATION IN BOD-CONTAINING WATER TREATMENT
Filed July 2, 1969  10 Sheets-Sheet 10

FIG.11

INVENTOR
JOHN R. McWHIRTER
BY
ATTORNEY

3,547,812
HIGH OXYGEN UTILIZATION IN BOD-CONTAINING WATER TREATMENT
John R. McWhirter, Williamsville, N.Y., assignor to Union Carbide Corporation, New York, N.Y., a corporation of New York
Filed July 2, 1969, Ser. No. 838,467
Int. Cl. C02c 1/10, 1/12
U.S. Cl. 210—7       10 Claims

ABSTRACT OF THE DISCLOSURE

BOD-containing water such as municipal waste is mixed with at least 60% oxygen gas and active biomass in accordance with specified relationships of oxygen feed gas quantity/energy supplied ratio, oxygen concentration range in the aeration gas, and degree of oxygen saturation in the mixing liquor.

CROSS-REFERENCES TO RELATED APPLICATIONS

The following applications relating to oxygenation of BOD-containing water were filed simultaneously with this application:

Ser. No. 838,442, Cyclic Oxygenation of BOD-Containing Water, J. R. McWhirter; Ser. No. 838,498, Biochemical Oxidation With Low Sludge Recycle, E. K. Robinson and J. R. McWhirter; Ser. No. 838,499, Bio-Oxidation With Low Sludge Yield, J. R. McWhirter; Ser. No. 838,500, Staged Oxygenation of BOD-Containing Water, J. R. McWhirter.

BACKGROUND OF THE INVENTION

This invention relates to a method for treating BOD-containing water by oxygenation. The BOD-containing water may for example be municipal waste, chemical waste from petrochemical or paper plants, or fermentation liquor.

Biochemical oxidation methods employ aerobic bacteria to convert various substrates and nutrients to other forms of matter. A common example is the activated sludge method for purifying sewage and industrial wastes. In such methods, the type and rate of reactions which occur are critically dependent upon the presence of ample oxygen for use by the bacteria. The oxygen is made available to the bacteria by dissolution into the liquor from an aerating gas, and by uptake of the dissolved oxygen (DO) by the bacteria.

High DO levels in the liquor are desirable for several reasons. For example, anaerobic zones are avoided and the rate of the biochemical reaction is not hindered from a lack of oxygen. Moreover, the bacterial population is improved by high DO levels because the growth of anaerobic and facultative strains is suppressed. Such strains cause odors and extend treatment time. Under certain conditions including high DO, a bacterial floc is formed which settles more rapidly to higher densities. This produces an improved effluent and renders the BOD-containing water treatment system less susceptible to upsets. Another desirable characteristic is that the large, desirable floc particles are more adequately supplied with oxygen throughout their mass because the DO gradient supplied through the particle is higher. Finally, high DO in the liquor in the system means that higher solids levels can be sustained with resultant higher treatment rate and lower production of excess sludge.

Air is the common source-gas for dissolution of oxygen into the liquor. A common dissolution technique is to sparge or diffuse compressed air into lower levels of open treatment tanks filled with a mixture of liquid and bacterial solids (mixed liquor). The sparged air serves the dual purposes of creating a large gas-liquor interfacial area for dissolution of oxygen, and of stirring the mixed liquor so that the solids remain in uniform suspension. For municipal sewage treatment, about 500 to 700 cu. ft. of air is usually diffused per lb. BOD removed from the influent water, and with 4 to 8 hours solids retention time, this corresponds to about 110–150 cu. ft. air per hour per 1000-gallon aeration tank capacity. Of the oxygen contained in this air, about 10% is dissolved and utilized in the biochemical oxidation and the remainder is wasted. The amount of air which needs to be introduced solely to keep the solids in suspension is on the order of 70–80 c.f.h. per 1000-gallon tank capacity, and is substantially less than that actually introduced in order to dissolve sufficient oxygen. Hence, it is seen that the amount of air supplied is dictated by "oxygen demand," and the amount of air is very large because of the low fraction of its contained oxygen which can be dissolved. The air is compressed to a level determined by friction in the system and submergence of the diffusers (e.g., 10 p.s.i.g.). Power costs vary between about 0.25 and 1.6 k.w.h. per lb. BOD removed, and average about 0.56 k.w.h. per lb. BOD removed.

It has long been recognized that the use of air as an oxygen source imposes a serious limitation on the rate of oxygen dissolution which can be sustained. Air contains only 20.8% oxygen and its other constituents are inert to the biochemical reactions. In practice, the dissolved oxygen is consumed from the mixed liquor by the bacteria so rapidly that the DO levels economically achievable with air aeration are suppressed below safe levels for a healthy, profuse growth of desirable aerobic bacteria. Anaerobic and facultative strains of bacteria may develop which cause odors and extend treatment time.

High solids levels in the aeration zone are also beneficial to BOD-containing water aeration because the rate of BOD removal becomes higher and the rate of excess sludge production becomes lower. However, high solids levels result in more rapid uptake of DO by the biomass, and in deference to the limited rate of dissolution of oxygen from air, waste treatment practitioners have deliberately reduced and suppressed active solids levels in the mixed liquor. When the solids level is reduced, the rate of BOD removal is decreased and treatment tanks remain large in order to retain the waste for the requisite time period (3–6 hours) necessary for purification.

The rate of oxygen dissolution can be increased by more violent agitation of the body of mixed liquor using surface aerators, beaters and submerged turbines. However, severe agitation breaks up and disperses the flocculant agglomerates so that after treatment, the solids do not separate properly from the effluent. Moreover, the solids, when gravity-settled, possess a high specific volume (Mohlman SVI) and the necessary recycle of such solids as inoculant represents a severe hydraulic burden on the system. Under conditions of low DO and low solids levels, the floc particles are small and fragile and are particularly susceptible to dispersion by attrition. Attempts to "overpower" the aeration system have also led to prohibitive investment and operating costs of the equipment involved.

It can be seen that the use of air as an oxygen source for biochemical reactions imposes serious penalties on the method. It has been proposed to use pure oxygen or oxygen-enriched air for aeration as a means of increasing dissolution rates. With pure oxygen, it is possible to increase the oxygen partial pressure difference between gas and liquid by five-fold. Many attempts have been made to utilize oxygen-enriched aeration gas but without commercial success. In some of these attempts, the oxygen-enriched gas were merely substituted for air using equipment and procedures common to air aeration. The high cost and low economy of these efforts resulted from the ineffective utilization of the oxygen which unlike air, is not "free" from the atmosphere. For example, when pure oxygen is sparged or diffused in the normal way into a conventional treatment tank for municipal sewage, only about 5–10% of the oxygen is consumed (i.e. dissolved and utilized) and the remainder escapes to the atmosphere.

One of the best known of the prior art attempts to employ oxygen-enriched aeration gas is the bioprecipitation process wherein a fraction of the effluent from a combined reactor-clarifier is mixed with the influent, oxygenated to near saturation, and then returned to the base of the reactor. The reactor contains a blanket of active solids and the highly oxygenated liquid rises slowly through the blanket, thereby transferring its organic pollutants to the bacterial floc and also supplying the needed oxygen for assimilation. The influent plus recycle effluent is oxygenated by downflow through a countercurrent gas-liquid contacting column—the oxygen-rich aeration gas being introduced at the base of the column and vented at the top. Although the countercurrent contactor is probably the most efficient mass transfer device for most chemical processes, it too has failed to achieve the economy necessary for oxygen aeration of a biochemical oxidation process. Only 20 to 25% consumption of the feed oxygen has been realized.

One reason for the low utilization of the bioprecipitation process is the very fact that the DO level in the oxygenator or contactor was pushed to near saturation with the result that the oxygen partial pressure driving force essentially vanished in the lower levels of the colume. Simultaneously, the $CO_2$ and $N_2$ impurities stripped from the liquid severely depressed the oxygen partial pressure driving force in upper levels of the column. These combined factors prevented dissolution of an economical, high fraction of the oxygen introduced. The near approach to DO saturation is a necessary objective of the process, since the full DO supply to treat the BOD-containing water must be contained and "carried" in the flow of diluted influent to the reactor.

It is an object of this invention to provide an improved method for treating BOD-containing water by oxygen-enriched aeration gas.

Another object is to provide a method characterized by relatively high consumption of oxygen in the aeration gas.

Still another object is to provide a method characterized by relatively high oxygen consumption, high dissolved oxygen in the mixed liquor, and high solids concentration.

Other objects and advantages of this invention will be apparent from the ensuing disclosure and appended claims.

SUMMARY

This invention relates to a method for treating BOD-containing water by oxygen-enriched aeration gas in contact with active biomass.

In this method, BOD-containing water, biomass and feed gas comprising at least 60% oxygen (by volume) are mixed in an aeration zone to form liquor. The mixing is continued while simultaneously maintaining: (a) the oxygen feed gas to mixing plus gas-liquid contact energy ratio at 0.03–0.40 lb. moles oxygen per horsepower hour of energy supplied, (b) the aeration gas above said liquor at oxygen partial pressure of at least 300 mm. Hg but below 80% oxygen (by volume) while consuming at least 50% (by volume) of the feed gas oxygen in the liquor, (c) the dissolved oxygen concentration of the liquor at below 70% of saturation with respect to the oxygen in the aeration gas but above about 2 p.p.m. and (d) continuously recirculating one of the aeration gas and liquor fluids in intimate contact with the other of said fluids in said aeration zone. Oxygenated liquor is thereafter withdrawn from the aeration zone.

This method may be used to treat municipal waste in a manner significantly more efficient (in terms of oxygen consumption) than the widely used air aeration treatment or than could be achieved in previously proposed oxygen aeration treatment methods.

DESCRIPTION OF PREFERRED EMBODIMENTS

Practice of the improved oxygen aeration method requires the use of a feed gas of at least 60% oxygen purity. As will be explained later herein, the oxygen content of the gas in the aeration zone is significantly lower than the feed gas owing to the accumulation of inert gases in the zone. Therefore, a substantial oxygen concentration margin should be provided in the feed gas to offset the mixing losses which occur in aeration and to maintain a high oxygen partial pressure in contact with the liquid.

The aeration gas must be held in the aeration or contact zone within the biochemical reactor, isolated from the atmosphere for a time sufficient for the dissolution of a large fraction of its contained oxygen into the liquor. During the retention period of the gas, at least one of the fluids (gas or liquor) is recirculated within the zone and contacted against the other. Devices such as packed columns which afford only momentary, once-through contact between the gas and liquid do not provide enough retention time. Even if "dosed" to saturation, the BOD-containing liquid to be treated would not hold all the oxygen in solution required for the reaction, and as will be described hereinafter, the oxygen gas to liquor dissolution process is not to be driven to near-saturation nor should the dissolved oxygen after treatment be wholly depleted from the oxygenated liquor. Hence, the time that the fluids are in contact is extended so that the rate of dissolution keeps pace with, but does not greatly exceed the rate of DO consumption.

In the aeration zone, a large interfacial area is generated between gas and liquor to promote rapid dissolution. However, this area must be produced in a manner which avoids a close approach to oxygen saturation in the liquid bounding the interfacial area. This is accomplished by producing the interfacial area in a large volume of liquor so that not more than a thin film of liquor at the interface will be near saturation, and so that the DO gradient from the interface to the bulk liquor will be high. Preferably, the liquor phase in the aeration zone should be continuous, or should approach continuity. Small bubbles of gas in the liquor constitute a desirable interfacial system, and surface aeration conducted by throwing relatively massive spouts or sheets of liquid into the gas is satisfactory. A liquid spray should be avoided because a droplet possesses a large surface area and a small volume of liquid.

As stated previously, the interfacial area should be produced in the liquor contained within the biochemical reactor. All the liquor in the reactor should participate in gas-liquor contact so that the DO can be replenished as it is consumed throughout the mixed liquor.

In order to preserve sufficient driving force for high-rate dissolution, the average mixed liquor DO level should not be forced above 70% of saturation with respect to the aeration gas oxygen purity, temperature and pressure prevailing in the aeration zone. Preferably, the DO level should be less than 35% of saturation. Avoiding excessive DO level in the bulk liquor assures a high total DO difference between the gas-liquor interface and the bulk liquid so that the DO is dispersed rapidly from the interface. Such dispersion proceeds by diffusion and by mixing, and both mechanisms become more rapid as the DO gradient increases at the interface.

The oxygen concentration of the aeration gas is significantly lower than the feed gas owing to the accumulation of gases such as nitrogen, $CO_2$ and argon. In the method of this invention, the accumulation of inerts is limited by venting gas from the aeration zone, continuously or intermittently, so as to maintain an oxygen partial pressure in the aeration zone as previously indicated of at least 300 mm. Hg and preferably at least 380 mm. Hg. Such concentration is needed, not only to maintain a high rate of dissolution but also to insure the growth of heavy, settable agglomerates of biomass.

If the oxygen feed point and the "spent" gas vent point are remote from one another, and if the flow channel between the two points is somewhat restricted, then the oxygen content of the gas will change significantly along the flow channel. The oxygen content will be highest at the feed point and lowest at the vent point. Where this situation exists, the foregoing minimum oxygen partial pressures refer to the zone of lowest oxygen content, or the venting region.

One important factor in control of the oxygen partial pressure in the aeration zone is the rate at which oxygen feed gas is introduced. Other factors remaining equal, an increase in the rate of oxygen introduction will increase the oxygen partial pressure in aeration and vice versa. Certain factors will tend to oppose this trend: as the partial pressure rises, the biochemical reaction rate will often increase and gaseous by-products will evolve more rapidly. Thus, a greater total quantity of inerts must be vented per unit time along with its complement of oxygen. More importantly it has now been recognized that with higher oxygen feed rate, each unit volume of vent gas will contain more oxygen due to the higher oxygen partial pressure in the aeration zone. Accordingly, the percentage of the oxygen which is consumed in the liquor will tend to decrease. Stated in another manner, during the venting of a given quantity of inerts the amount of oxygen wasted will increase as the oxygen content of the aeration gas increases.

This invention utilizes the foregoing relationship by limiting the aeration gas to less than about 80% oxygen and preferably less than about 65% oxygen (by volume). As in the instance of the lower limit of oxygen partial pressure, the upper composition limit refers to the region of the aeration zone from which the inerts are vented. If the feed-to-vent gas flow channel sustains an oxygen purity gradient, as described previously, then upstream regions in the aeration zone will advantageously contain aeration gas of higher oxygen content than the vent gas.

It will now be evident from the foregoing explanation that the desire for high oxygen partial pressure in aeration and for high percentage utilization of the feed gas oxygen are conflicting objectives. This treatment method resolves the apparent dilemma by adherence to the foregoing lower limit of oxygen partial pressure and upper limit of oxygen content in the aeration gas. The method can be controlled to maintain operation between these limits and the rate of oxygen introduction is one factor in achieving such control.

In this biochemical treatment method, at least 60% oxygen feed gas is supplied to the aeration zone, energy is supplied for contacting the gas and liquor, and a portion of the aeration gas in the form of a gaseous residue of undissolved oxygen and accumulated impurities is vented. The relationship between oxygen feed gas flow rate and energy input is a further important factor of the invention. If more contacting energy is supplied with each volume of oxygen feed gas, then a larger fraction of its oxygen will be dissolved and a lower fraction will be wasted in the vent gas. Energy cannot be increased without limit because each additional percentage point of oxygen utilized must be dissolved from gas of progressively lower oxygen partial pressure. Moreover, with a given quantity of liquor in the aeration zone to receive the dissolved oxygen, an increase in energy will drive the DO level closer to saturation and the rate of dissolution will drop. Hence, incremental energy affords diminishing returns. As a further restraint, it was previously indicated that excessive mixing energy will damage the flocculant biomass and impair subsequent separation. It has now been discovered that the amount of oxygen supplied bears a close relationship to the amount of energy supplied. High oxygen partial pressure and mixing energy both provide driving force for dissolution, but by this invention the forces are employed in balance to achieve remarkably higher percent utilization than attainable by the prior art with high oxygen partial pressure in the aerator zone. This balance is achieved by maintaining the oxygen feed gas to mixing plus gas-liquor contact energy ratio as 0.03–0.40 lb. moles oxygen per horsepower-hour of energy supplied. In a preferred embodiment the ratio is 0.1–0.2 mole oxygen per horsepower-hour of energy supplied.

The energy supplied to the aeration zone must of course be used efficiently to generate the gas-liquor interfacial area required for oxygen solution, i.e., the gas-liquor contact energy. Mixing energy must also be employed to hold the solids uniformly in suspension and to circulate the mixed liquor repeatedly through the gas-liquor contactor. Many types of aeration devices are commercially available, and generally, they are rated according to a "standard air transfer efficiency." The latter rating specifies the lbs. oxygen which the device will dissolve from air into zero-DO tap water per horsepower-hour at 20° C. and 1 atmosphere pressure. An aeration device should be chosen whose air transfer efficiency is at least 1.5 and preferably 2.5 lb. oxygen/horsepower hour in order that the oxygen may be dissolved rapidly despite the relatively small volume of gas fed to the system, and in order that the heavy floc will not be damaged and dispersed. In view of the small volume of oxygen-enriched gas involved (relative to the volume of air commonly used), it is preferable to employ a combination of a mechanical agitator for liquor stirring (mixing energy) and a submerged gas diffuser for gas-liquor contacting. However, some surface type aerators of the splash type will perform both functions in a satisfactory manner.

Within the above stated range of 0.03 to 0.40 lb. mole oxygen/horsepower hour, the oxygen and power supplied should be matched for best economy depending upon the applicable costs of aeration equipment, power and oxygen. Notwithstanding variations in these cost elements, aeration in accordance with this invention can achieve at least 50% utilization of the oxygen supplied while maintaining an oxygen partial pressure several times greater than obtained with air aeration and while consuming substantially less power than required for dissolution of an equal quantity of oxygen from air.

Figure 1:
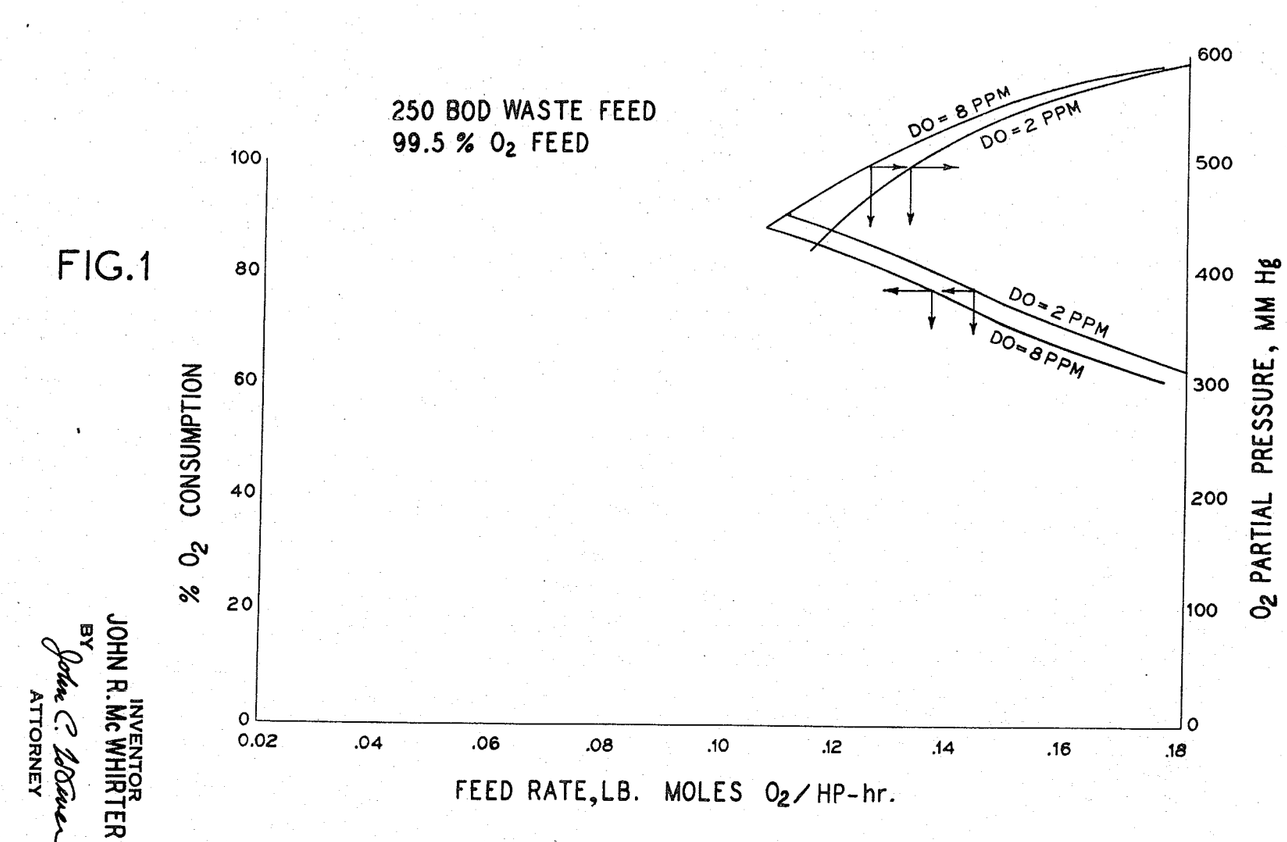
FIG. 1 is a graph showing the relationship between both oxygen consumption and aeration gas oxygen concentration as ordinates versus oxygen feed gas rate/energy supplied ratio as the abscissa, for a municipal-type waste water having 250 p.p.m. BOD, dissolved oxygen concentrations of 2 p.p.m. and 8 p.p.m. and 99.5% oxygen feed gas.
Figure 2:
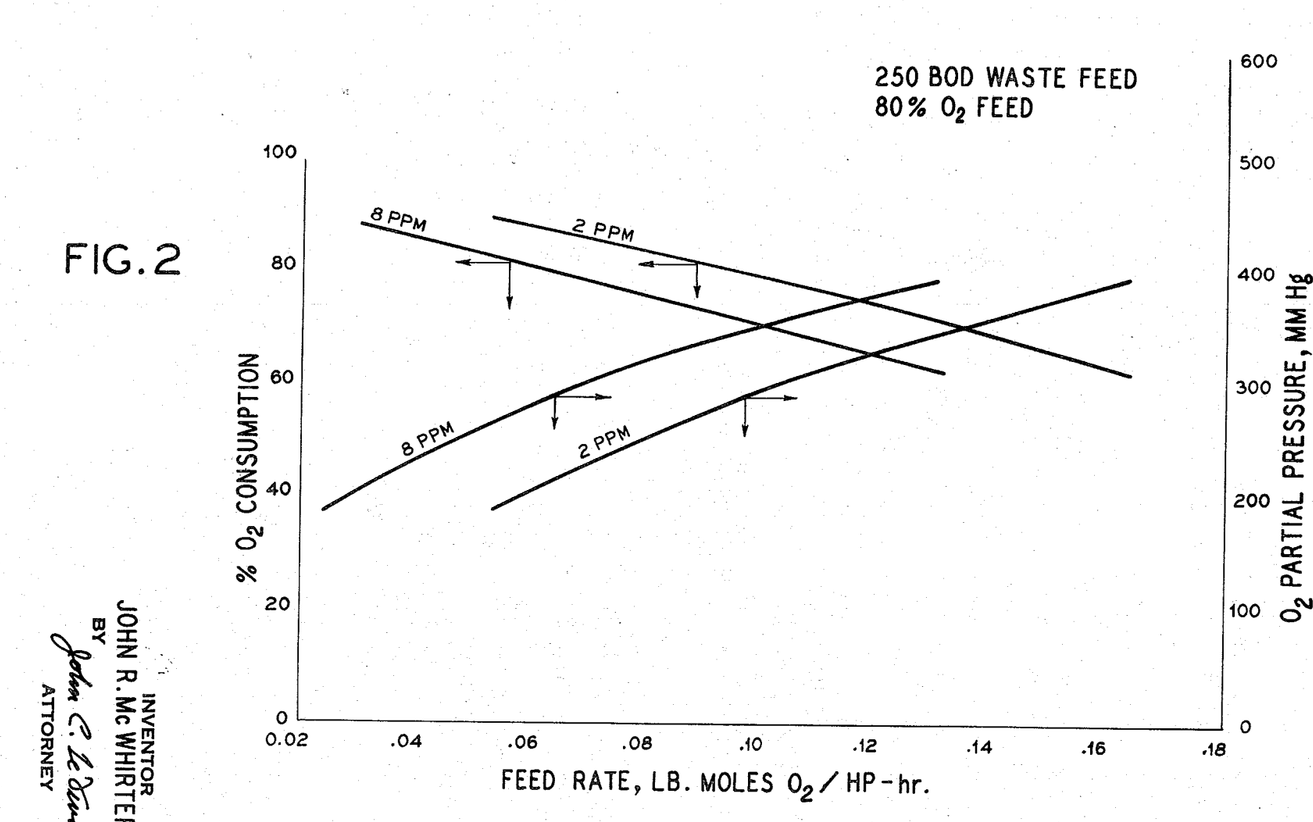
FIG. 2 is a graph similar to FIG. 1 but for 80.0% oxygen feed gas.
Figure 3:
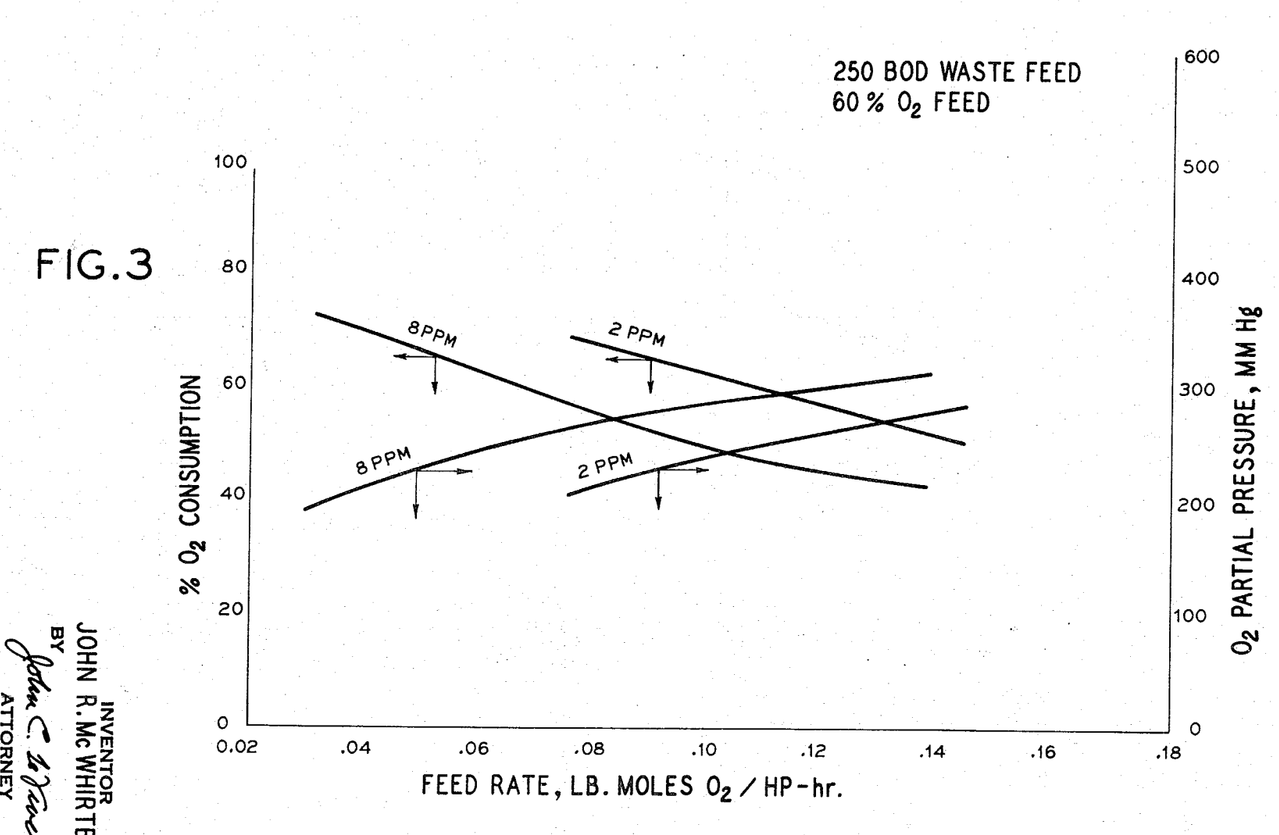
FIG. 3 is a graph similar to FIGS. 1 and 2 but for 60.0% oxygen feed gas.

FIGS. 1, 2 and 3 show computed results based on information confirmed by operating data in a pilot plant used for treating municipal waste with oxygen-enriched aeration gas. The computed results are for a single stage aeration system handling mixed liquor with a 2-hour solids residence time, with 4000 p.p.m. volatile suspended solids content (MLVSS), and with a waste feed BOD strength of 250 p.p.m. The biomass for the aeration zone is provided by recycling activated sludge from a clarifier which in turn receives oxygenated liquor from the aeration zone. Six sets of data are included for oxygen feed purities of 60%, 80% and 99.5% and for DO levels of 2 p.p.m. and 8 p.p.m. In each data set, the power requirement and percent oxygen consumption were determined for various oxygen feed gas rates. FIG. 1 summarizes the results with 99.5% oxygen feed, and FIGS. 2 and 3 with 80% and 60% oxygen feed, respectively.

Referring to FIG. 1 for 99.5% oxygen feed, it is seen that high percent oxygen consumption can be obtained while maintaining high oxygen partial pressure in the aeration zone. The oxygen partial pressure curves, plotted on the right-hand ordinate, provide an indication of the lower limit of oxygen feed rate which will still produce a lower limit partial pressure of at least 300 mm. Hg. oxygen in aeration. The percent consumption curves, plotted on the left-hand ordinate provide an indication of the upper limit of oxygen feed rate which will still permit at least 50% utilization of the oxygen in the feed. Extrapolation of the partial pressure curves to the minimum $pO_2$ of 300 mm. Hg indicates that feed rates as low as about 0.075 lb. moles $O_2$/HP-hr. are permissable for 8 p.p.m. DO, and as low as about 0.095 lb. moles for 2 p.p.m. DO. Similarly, the percent consumption curves can be extended to about 0.21 lb. moles $O_2$/HP-hr. before falling below the minimum 50% consumption. The percent oxygen consumptions corresponding to 300 mm. Hg partial pressure are above 90% for both DO levels. FIG. 1 also shows that for the aeration gas oxygen concentration upper limit of 80% (about 600 mm. Hg at 1 atmosphere) the oxygen utilization drops to about 60% for both DO levels.

FIG. 2 for 80% oxygen feed shows minimum feed rates corresponding to 300 mm. Hg partial pressure of about 0.07 and 0.10 lb. moles/HP-hr. for 8 and 2 p.p.m. DO, respectively. Maximum feed rates corresponding to 50% consumption are about 0.18 and 0.20 lb. moles $O_2$/HP-hr. for 8 and 2 p.p.m. DO, respectively. Thus, the range of feed rates which permit operation within the limits of the invention is still ample. However, it will be noted that about 80% consumption is the best that can be achieved with partial pressure above 300 mm. Hg. It is also significant that if the oxygen partial pressure was increased by higher $O_2$ feed rate to achieve 80% oxygen (600 mm. Hg), the corresponding percent consumption would be far below the required 50% and thereby outside the scope of this method.

A study of FIG. 3 for 60% oxygen feed will show that operation according to the invention requires precise control of the oxygen feed rate with a very narrow range. The partial pressure curve for 8 p.p.m. DO rises above 300 mm. at about 0.12 lb. moles $O_2$/HP-hr. and the percent oxygen consumption curve falls below 50% at about 0.10 lb. moles $O_2$/HP-hr. For 2 p.p.m. DO the same near-coincidence of minimum and maximum feed rates occurs at about 0.15 lb. moles $O_2$/HP-hr. Thus, dropping the feed purity to 60% has greatly narrowed the operating range. The best (and only) percent consumption which can be achieved with a partial pressure above 300 mm. Hg is 50%. Upon further reduction in oxygen feed purity, the "minimum" feed rate established by 300 mm. partial pressure would be higher than the "maximum" established by 50% consumption and the requirements of this method could not be met at any feed rate.

To illustrate use of the FIGS. 1–3 curves, Table A compares the three feed gases at an oxygen gas feed rate of 0.11 lb. moles $O_2$ HP-hr. and a DO level of 8 p.p.m.:

TABLE A

| | $O_2$ consumption, percent | Aeration zone $O_2$ partial pressure, mm. |
|---|---|---|
| Feed gas: | | |
| 60%, $O_2$ | ~50 | 300 |
| 80%, $O_2$ | 70 | 350 |
| 99.5%, $O_2$ | 90 | 450 |

Similarly, Table B compares feed rates and percent oxygen consumption for the three feed gas purities at a uniform partial pressure of 300 mm. Hg:

TABLE B

| | DO = 8 p.p.m. | |
|---|---|---|
| | Feed rate | $O_2$ consumption, percent |
| Feed gas: | | |
| 60%, $O_2$ | .112 | 85 |
| 80%, $O_2$ | .067 | 80 |
| 99.5%, $O_2$ | .072 | 9 |

The FIG. 1 curves also illustrate the low sensitivity of the method to variations in DO-level when an 99.5% oxygen feed is employed. The two sets of curves for 2 and 8 p.p.m. DO are very close together so that increasing the DO-level in this range would have no significant effect on either percent oxygen consumption or aeration zone oxygen partial pressure. However, the FIGS. 2 and 3 curves for 80% and 60% oxygen feed both show appreciable sensitivity to DO-level changes. Because DO levels do in fact vary in waste treatment plants due to changes in feed flows and BOD level, this insensitivity in oxygen consumption represents an important advantage of the preferred embodiment over that wherein the feed gas comprises at least 90% oxygen. That is, a 90% oxygen feed gas would be relatively insensitive to changes in DO levels as compared to 60% oxygen.

The air standard transfer efficiency of the aerator upon which FIGS. 1–3 are based is between 3 and 3.5 lb. $O_2$/HP-hr. The effect of using a less efficient device would depress the percent consumption curves and raise the partial pressure curves, whereas a more efficient device would have the opposite effect. However, the conclusion drawn with respect to the limited utilization at 60% oxygen feed would not be materially affected.

It should also be understood that the power consumption to which the oxygen feed rate is related in the abscissas of the figures is the total power required for solid-liquid mixing and for gas-liquid contact. For conventional air diffusers, the total power is usually consumed by air compressors. In other aerator systems, a part of the power is consumed by mechanical agitators to hold the solids in suspension, and the remainder of the power is used by compressors which supply gas to submerged spargers. In still other surface aerators, all the power is consumed in mechanical agitation of the liquor.

Because the mixing power is included in the ratio of the oxygen feed/total power, the latter values are influenced by the treatment or retention time of the mixed liquor solids in aeration. Mixing energy must be supplied at steady rate, and if treatment time is long, the basins will be large and mixing energy consumption relatively high. Also, if treatment time is long, the rate of oxygen feed may be relatively low, reflecting slow volumetric uptake rate of DO. Thus, with extended treatment time, mixing energy constitutes a larger fraction of the total energy, and the ratio of oxygen feed/power is relatively low. For short treatment time, the opposite is true.

Figure 4:
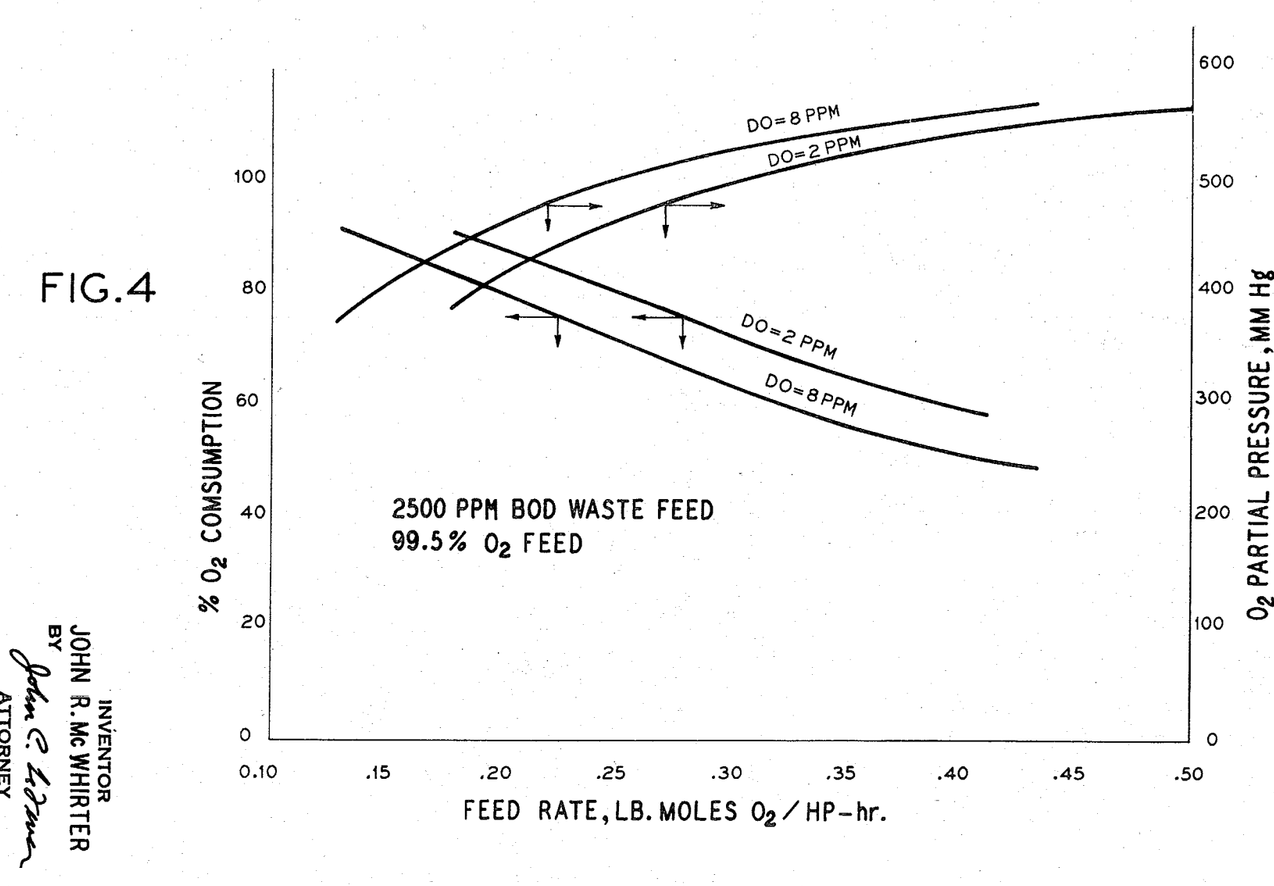
FIG. 4 is a graph similar to FIG. 1 but for an industrial-type waste water having 2500 p.p.m. BOD using 99.5% oxygen feed gas.
Figure 5:
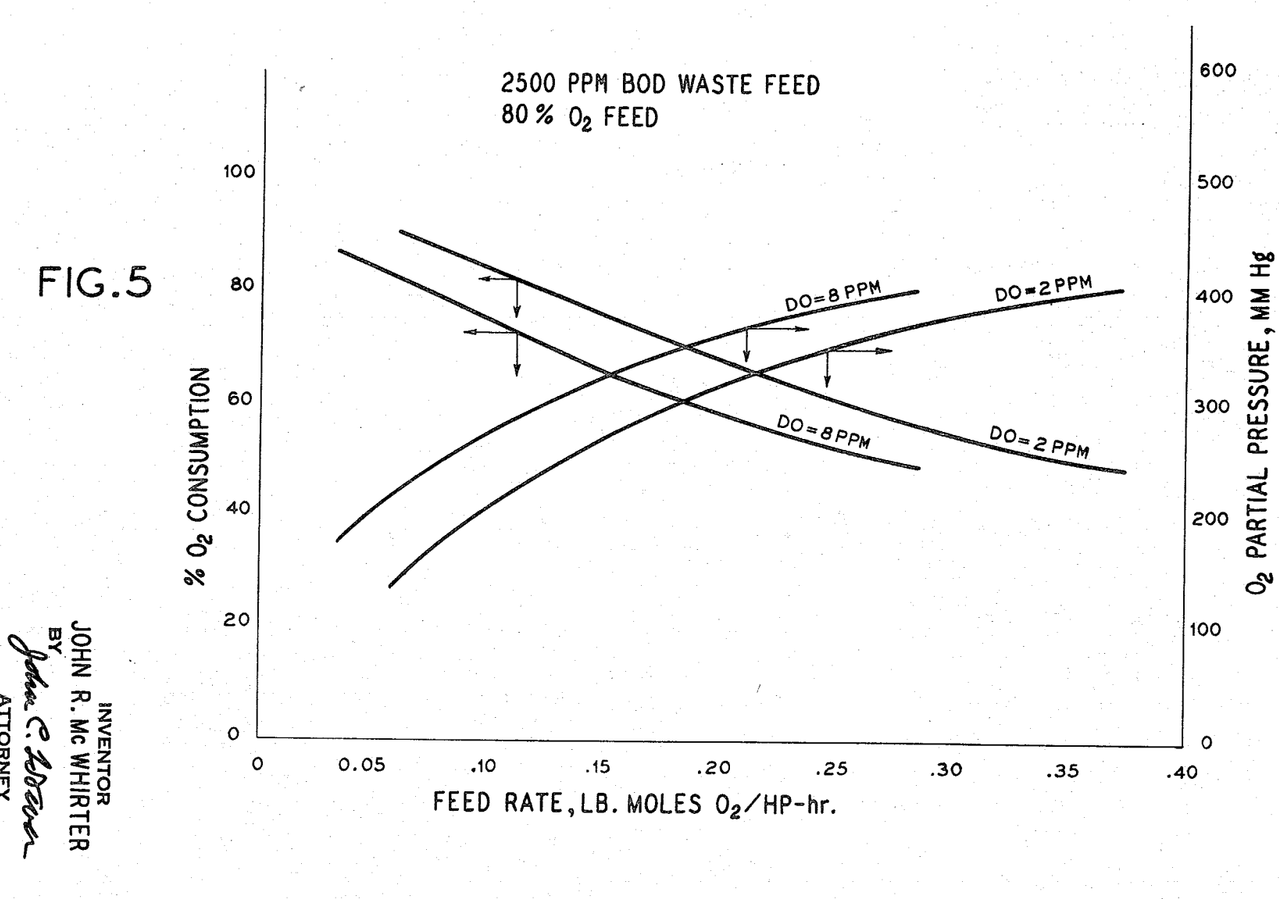
FIG. 5 is a graph similar to FIG. 4 but for 80.0% oxygen feed gas.
Figure 6:
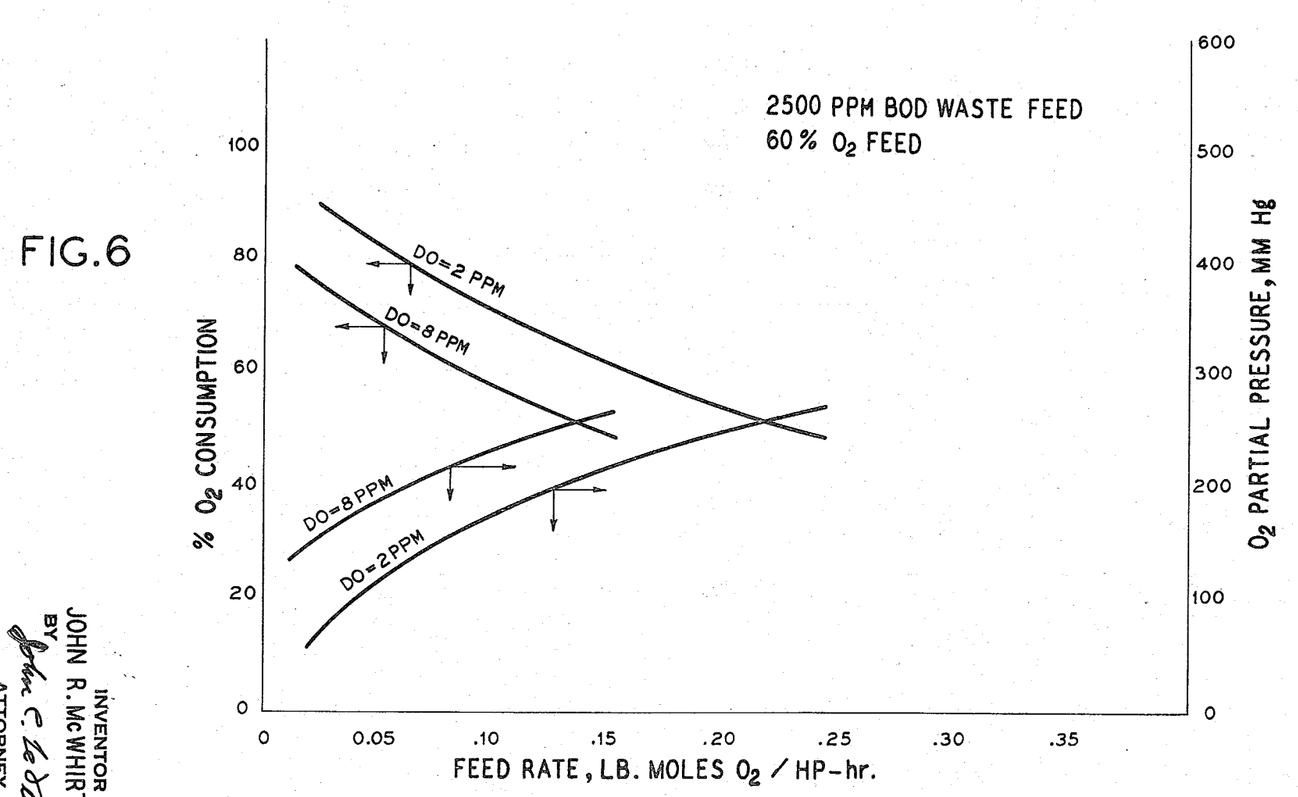
FIG. 6 is a graph similar to FIGS. 4 and 5 but for 60.0% oxygen feed gas.

FIGS. 4, 5 and 6 are similar to FIGS. 1, 2 and 3, respectively, except that the mixed liquor MLVSS is 6000 p.p.m. and the waste feed BOD strength is 2500 p.p.m. While the FIGS. 1–3 typify low strength municipal wastes, the FIGS. 4–6 typify treatment of higher strength industrial wastes by the instant method. One effect of increasing the BOD strength (and the MLVSS) is to increase the uptake rate of dissolved oxygen. At a given oxygen feed rate per horsepower-hour, this increases the percent oxygen consumption and decreases the oxygen partial pressure.

With reference to FIG. 4 for 99.5% oxygen feed gas and 8 p.p.m. DO, the oxygen feed rate to maintain 300 mm. Hg oxygen partial pressure may be approximated from the curve and is about 0.10 lb. mole $O_2$/HP-hr. and the oxygen feed rate for 50% consumption is 0.42 lb. mole $O_2$/HP-hr. It will be apparent that for this particular embodiment the aeration gas must be maintained considerably below 80% oxygen (600 mm. Hg at 1 atmosphere) to avoid exceeding the 0.40 upper limit on the ratio of oxygen feed rate/energy supplied and dropping below the 50% oxygen consumption lower limit. For 2 p.p.m. DO, the minimum feed rate is about 0.14 lb. mole $O_2$/HP-hr. for the aeration gas minimum of 300 mm. Hg oxygen partial pressure and the maximum is 0.52 lb. mole $O_2$/HP-hr. for 50% consumption, but the latter is above the upper limit of this invention for oxygen feed gas rate/energy supplied. The permissible operating range is large and includes high percent consumption and corresponding high oxygen partial pressures.

FIG. 5 for 80% oxygen feed gas shows minimum and maximum oxygen feed rates of 0.12 and 0.28 lb. mole $O_2$/HP-hr., respectively, for 8 p.p.m. DO, and of 0.18 and 0.36 lb. mole $O_2$/HP-hr., respectively for 2 p.p.m. DO. Again 80% oxygen in the aeration gas is precluded by low oxygen consumption and high oxygen feed gas rate/energy supplied.

With reference to FIG. 6 for 60% oxygen feed and 2500 p.p.m. BOD waste liquid, it is clear that the oxygen feed range for practicing the invention has vanished at both 2 and 8 p.p.m. DO-levels in the liquor. For example, at 8 p.p.m. DO-level, the oxygen feed rate must be at least 0.24 lb. mole $O_2$/HP-hr. to reach a partial pressure of 300 mm. Hg, yet the oxygen feed rate cannot be above 0.15 lb. mole $O_2$/HP-hr. and still obtain an oxygen consumption of 50% or higher. Returning to FIG. 3, for 60% oxygen feed and 250 p.p.m. BOD waste liquid, the same "negative" operating range is seen to exist, although there is much less disparity between the limits imposed by oxygen consumption and oxygen partial pressure. While the disparity for high strength, 2500 p.p.m. BOD liquid is 0.15−0.24=−0.09 lb. mole $O_2$/HP-hr., the disparity for 250 p.p.m. BOD liquid is only 0.10−0.12=−0.02 lb. mole $O_2$/HP-hr. It is apparent that a still further reduction in the BOD strength of the waste liquid fed to the process, as may readily exist in dilute municipal wastes, will result in a finite operating range applicable to 60% oxygen feed. However, a comparison of the 80% and 60% oxygen feed curves for either waste strength (FIGS. 2 and 3 or FIGS. 5 and 6) shows that a further reduction in oxygen feed purity below 60% is not feasible since the requirements for at least 50% oxygen consumption and at least 300 mm. Hg oxygen partial pressure cannot be met simultaneously.

Figure 7:
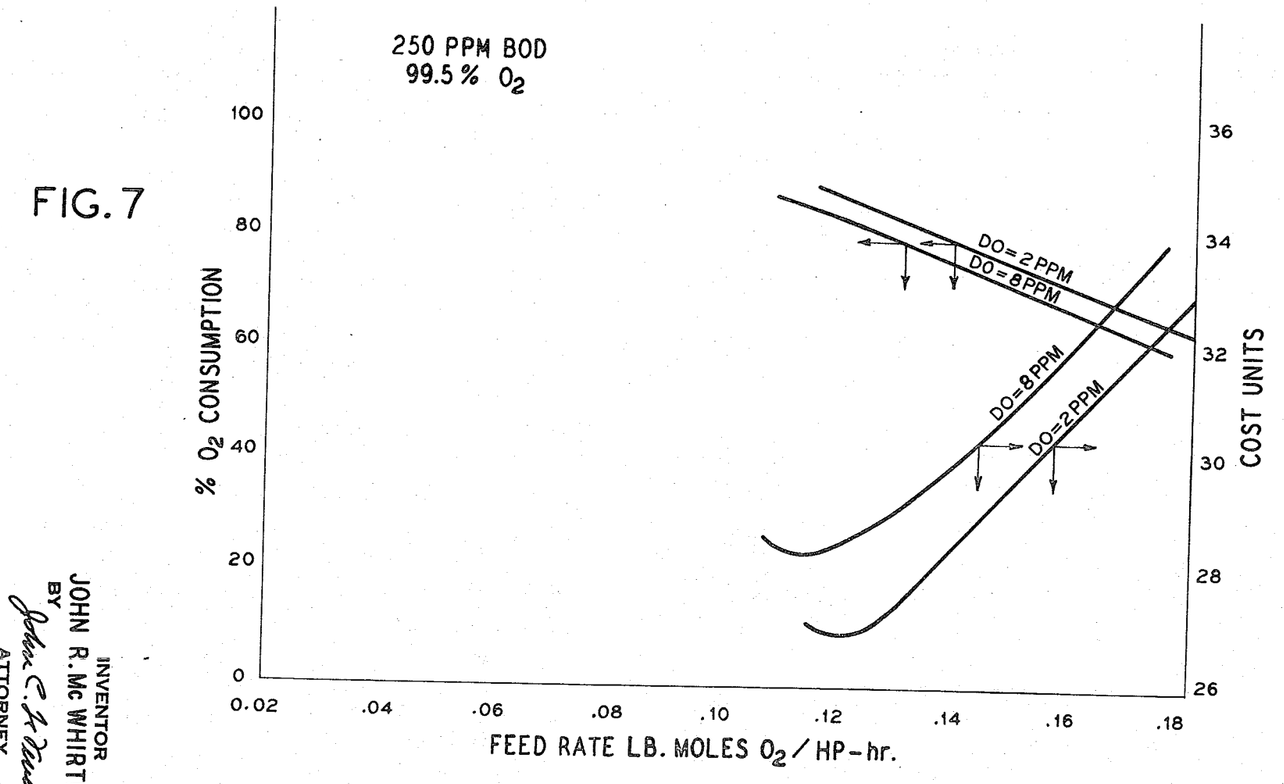
FIG. 7 is a graph showing the total annual aeration cost as the ordinate versus oxygen feed gas rate/energy supplied ratio as the abscissa, for dissolved oxygen concentrations of 2 p.p.m. and 8 p.p.m. with the municipal-type waste water and 99.5% oxygen feed gas of FIG. 1.
Figure 8:
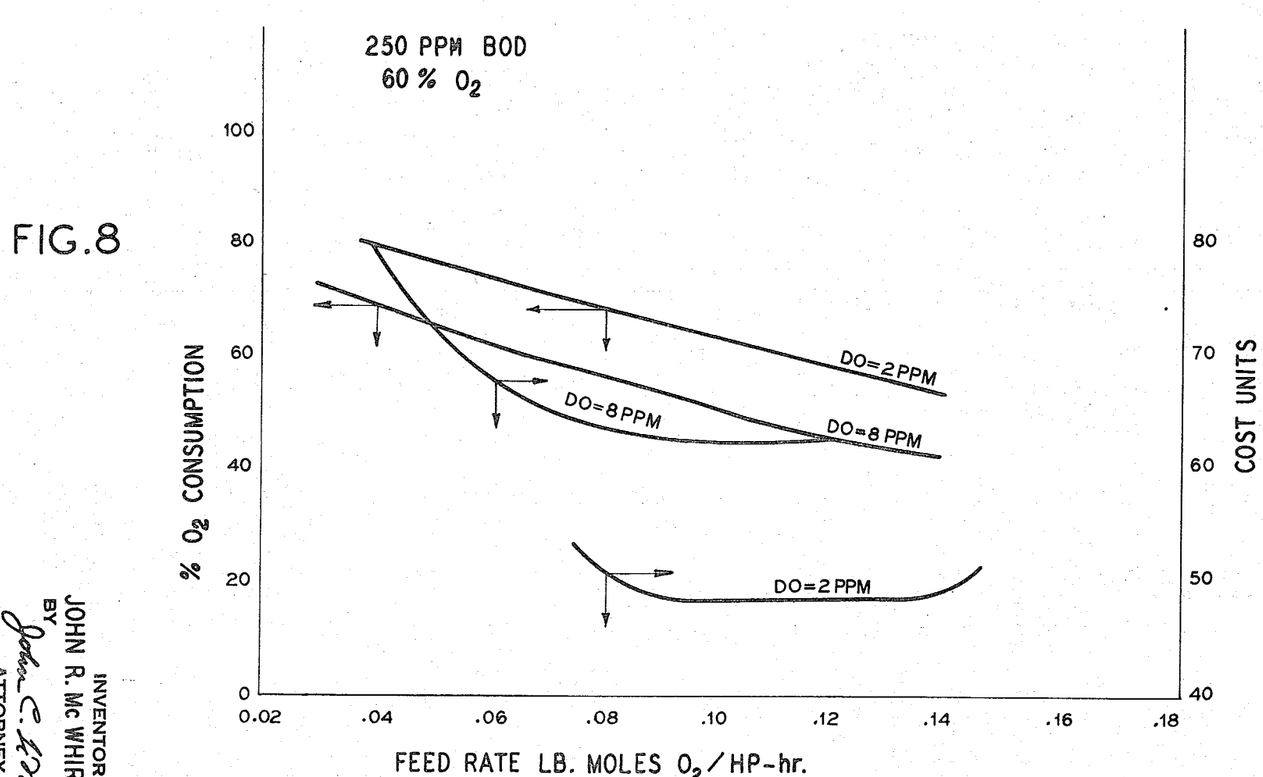
FIG. 8 is a graph similar to FIG. 7 but for 60% oxygen feed gas.

FIGS. 7 and 8 illustrate the variation in cost of treating 250 BOD waste at different oxygen feed rates. The "cost units" shown on the right-hand ordinate are relative values only, but they reflect the total costs of aeration, including investment in aeration equipment, depreciation, maintenance and power. FIG. 7 for 99.5% oxygen feed shows very sharp optimums at about 0.12 lb. mole $O_2$/HP-hr., where the costs for maintaining 2 and 8 p.p.m. DO-levels are about 27 and 28 cost units, respectively. The corresponding values of oxygen consumption are about 90%. FIG. 8 for 60% oxygen feed shows optimums for 2 and 8 p.p.m. DO at about 0.11 lb. mole $O_2$/HP-hr. where the aeration costs are about 50 and 60 units, respectively Thus, the location of the optimums of FIG. 8 establish 50% oxygen consumption as the minimum consistent with lowest cost treatment of BOD-containing liquids.

By comparing FIGS. 7 and 8, it is also apparent that the method using 99.5% oxygen feed gas is relatively insensitive to change in DO-level. In contrast, the use of 60% oxygen feed gas entails significantly higher operating costs with increasing DO-level.

Figure 9:
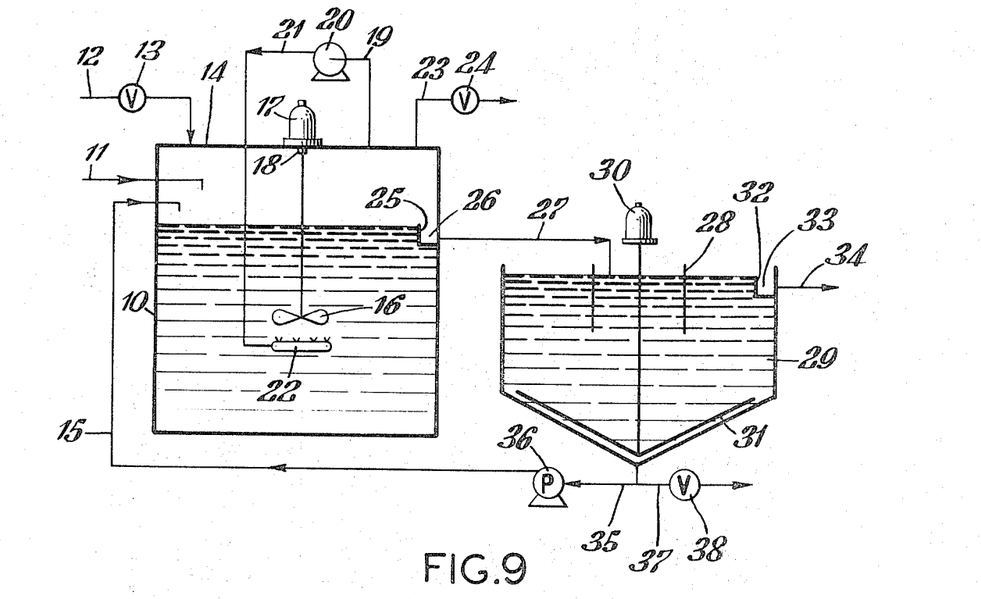
FIG. 9 is a schematic view taken in cross-sectional elevation of apparatus including a single submerged agitator and sparger assembly within an aeration chamber, and a clarifier arranged to practice one embodiment of the method of this invention.

Referring to FIG. 9, BOD-containing water, as for example municipal sewage, enters chamber 10 through conduit 11. A source (not shown) of oxygen comprising at least 60% oxygen is provided and the oxygen gas is flowed therefrom through conduit 12 having control valve 13 therein to chamber 10. The latter is provided with gas-tight cover 14 to maintain an oxygen-enriched aeration gas environment over the liquor. Recycling sludge is also introduced to chamber 10 through conduit 15, although the BOD-containing feed water and sludge may be mixed prior to introduction in the chamber if desired.

The aforementioned streams are intimately mixed to form liquor preferably having volatile suspended solids content (MLVSS) of at least 3000 p.p.m. in chamber 10 as the aeration zone. This mixing is by mechanical agitation means 16 driven by motor 17 having a shaft passing through seal 18 in the cover 14. Although the agitation means may comprise one or more impellers located near the liquor surface, it is illustrated as positioned below the surface. In this particular embodiment, oxygenating aeration gas disengaged from the liquor body into the overhead gas space is withdrawn through conduit 19 by blower 20 for compression and return through conduit 21 to submerged sparger of diffuser 22 preferably positioned beneath agitator 16. That is, the aeration gas is continuously recirculated in intimate contact with the liquor body in chamber 10. Blower 20 is driven by a motor (not illustrated) representing the gas-liquor contact energy, and is preferably provided with controls to permit adjustment of its speed of rotation. Oxygen-depleted or spent oxygenation gas is discharged from chamber 10 through restricted flow conduit 23 which may also be provided with flow control valve 24.

To practice the method of this invention, the BOD-containing water, oxygen-rich feed gas and sludge are mixed to form the mixed liquor, and the oxygenating gas is continuously recirculated into the liquor for dissolution. Inert gases such as nitrogen entering with the BOD-containing water and with the oxygen-rich feed gas, and gases such as $CO_2$ produced in the biochemical reaction are evolved and collected with unconsumed oxygen in the space above the liquor. This aeration gas has an oxygen partial pressure of at least 300 mm. Hg may preferably at least 380 mm. Hg. The oxygen-rich gas may be continuously introduced to chamber 10 through conduit 12 during the mixing step, or the gas flow may be terminated when mixing is started. The oxygen-depleted aeration gas may be continuously or intermittently discharged from the overhead space through conduit 23.

The liquor level in enclosure 10 is controlled by weir 25 which discharges into overflow trough 25 and thence through discharge conduit 27. The dissolved oxygen level in the oxygenated liquor formed in the mixing step is maintained at below 70% of saturation with the oxygen in the aeration gas and is preferably at least 2 p.p.m. Adjustments in DO level may be accomplished by varying the rate of oxygen-rich feed gas flow using valve 13 in conduit 12 thereby increasing or decreasing the oxygen partial pressure in the enclosure 10 gas space. The DO level may also be adjusted by varying the power input and speed of rotation of blower 20, thereby increasing or decreasing the rate of diffusion of oxygenated gas into the liquor. The DO level may also be controlled by varying the retention time of the liquor in chamber 10. All other parameters being constant, a longer liquor retention time tends to provide a higher DO level.

At the end of the mixing step for example 20 to 180 minutes duration, oxygenated liquor is discharged through conduit 27 to within a central concentric baffle 28 of clarifier 29. Baffle 28 preferably extends from above the liquid level to a point intermediate this level and the clarifier's conical bottom. Motor 30 drives a slowly rotating rake 31 across the clarifier bottom to prevent "coning" of the dense settled sludge. The purified supernatant liquid overflows weir 32 into trough 33 and is discharged through conduit 34. The sludge is withdrawn from the clarifier bottom through conduit 35 and at least a portion thereof is pressurized by pump 36 for recycling in conduit 15 to enclosure 10 for inoculation of the incoming BOD-containing water. Any sludge not needed for recirculation is discharged through bottom conduit 37 having control valve 38 therein.

Figure 10:
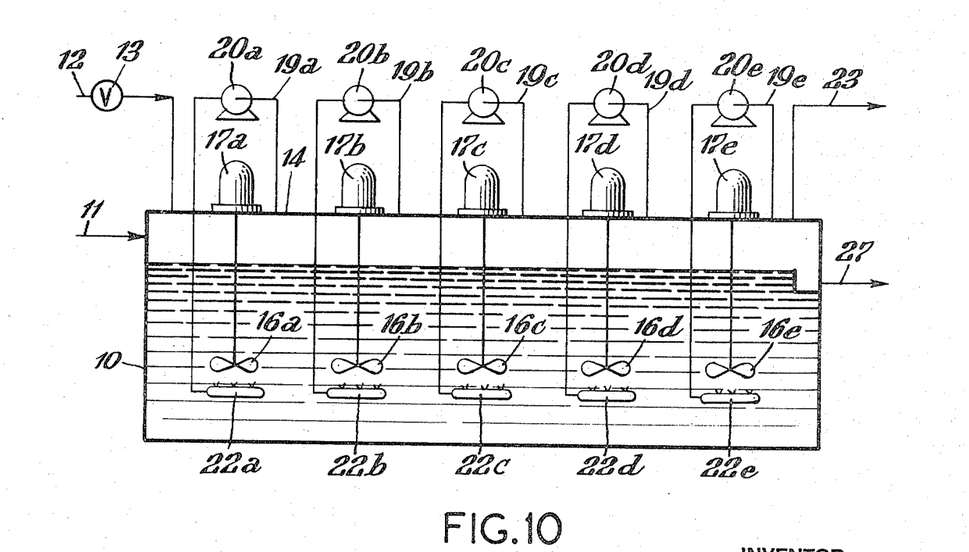
FIG. 10 is a schematic view taken in cross-sectional elevation of apparatus characterized by a multiplicity of submerged agitators and spargers all positioned within the same aeration chamber to practice another embodiment.

FIG. 10 illustrates different apparatus for practicing this method, employing a multiplicity of submerged agitators 16a–e and recirculation oxygen enriched gas spargers 22a–e spaced longitudinally from end-to-end of oxygenation enclosure 10. After premixing, BOD-containing water and recycling sludge are introduced through conduit 11 at one end of enclosure 10. The resulting liquor is mixed with oxygen-rich gas introduced through conduit 11 and the oxygenated liquor discharged from the opposite end of enclosure 10 through conduit 27 to a clarifier (not shown). Oxygen-depleted gas is also discharged from the space above the liquor level and at this opposite end through conduit 23 oxygentating aeration gas is withdrawn through longitudinally spaced conduits 19a–e for pressure recirculation through blowers 20a–e and spargers 22a–e in a manner analogous to the FIG. 9 embodiment.

Enclosure 10 may be designed so that its length is very large relative to its width and depth. For a given enclosure volume such geometry increases the velocity of liquor flow from feed end to discharge end, and suppresses backmixing of liquor from downstream zones into upstream zones. Such suppressed backmixing or plug flow is beneficial when multiple mixing means are employed in the instant method. When back-mixing is prevented, the food/biomass ratio (lbs. $BOD_5$/day×lb. MLVSS) is high at the feed end of the enclosure where the BOD-containing water enters, and is low at the discharge end where the oxygenated liquor overflows to the clarifier. Both of the local conditions are beneficial to complete and high rate bio-oxidation.

It will be apparent from the foregoing description of FIG. 10 that the liquor is oxygenated in a series of stages from the feed to the discharge end of container 10 even though the stages are not physically partitioned from each other. If container 10 is designed with small lateral cross-sectional area in the gas space beneath cover 14, a similar staged or plug flow effect can be realized in the oxygenation gas flow from feed to discharge end. This also promotes virtually complete BOD removal at high flow rate, because a substantially higher partial pressure of oxygen can be maintained over the liquor at the feed gas end. Another advantage of staged gas flow is that the inert gaseous impurities can be discharged from the opposite end in a smaller volume of aeration vent gas. As the oxygenation gas flows from end-to-end of the enclosure 10 the rate of oxygen dissolution into the liquor is substantially greater than the rate of inert gas evolution from the liquor. Accordingly, the volume of the oxygenating gas stream progressively diminishes and its fractional content of inerts increases from the gas feed to discharge end. It is desirable to aerate the high food/biomass zone (where BOD-containing water is introduced) with the gas of highest oxygen content available because the oxygen demand is greatest in this zone. Conversely, the oxygen demand is lowest at the oxygenated liquor discharge region and it is preferable to employ the available aeration gas of lowest oxygen content in this region. Accordingly, in embodiments of this invention wherein liquor is flowed through a multiplicity of zones for staged mixing with oxygen-enriched aeration gas, it is also preferred to flow the aeration gas concurrently with the liquor from stage-to-stage with the gas of highest oxygen content mixing with the water of highest BOD.

Figure 11:
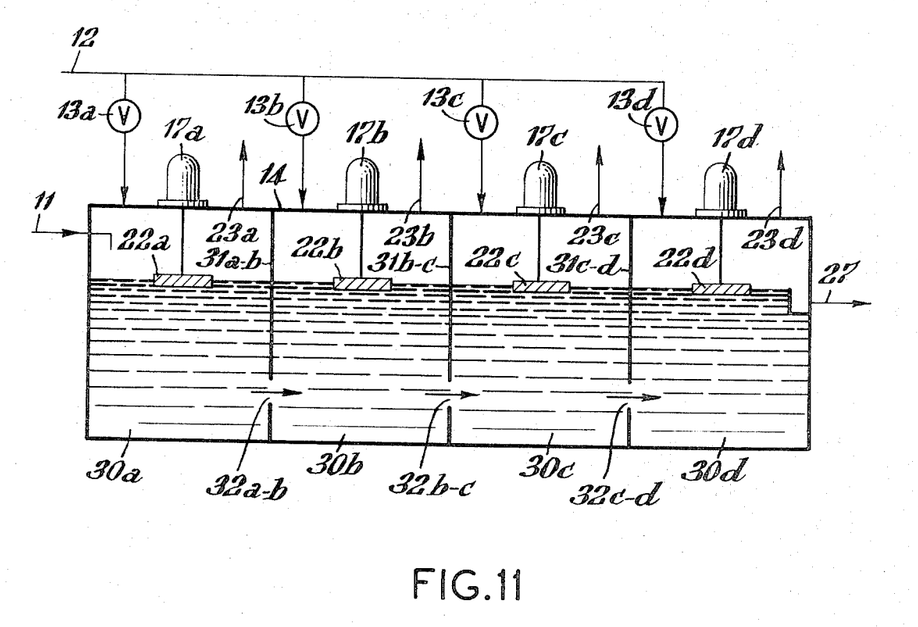
FIG. 11 is a schematic view taken in cross-sectional elevation of apparatus to practice still another embodiment characterized by a multiplicity of aeration chambers each having a surface-type mixer and oxygen feed gas introduction means and arranged for staged flow of oxygenated liquor.

The FIG. 11 apparatus illustrates a mixing chamber 10 divided into four separate compartments or stages 30a, 30b, 30c and 30d. Partition 31a–b extends from bottom to top of chamber 10 to separate first and second compartments 30a and 30b. Similarly, partition 31b–c separates second and third compartments 30b and 30c, and partition 31c–d separates third and fourth compartments 30c and 30d. Restricted opening 32a–b provides flow of partially oxygenated liquor from first compartment 30a to second compartment 30b, restricted opening 32b–c provides flow of further oxygenated liquor from second compartment 30b to third compartment 30c, and restricted opening 32c–d provides flow of still further oxygenated liquor from third compartment 30c to fourth compartment 30d.

Oxygen-rich gas is introduced through manifold 12 and control valves 13a, 13b, 13c and 13d in branch conduits to each of the four compartments for simultaneous mixing therein with BOD-containing liquor. These valves may for example, be responsive to a suitable variable such as DO level in the liquor or gas composition within the compartment. Surface-type aerators 22a, 22b, 22c and 22d throw massive spouts or sheets of liquor into the aeration gas. Accordingly, these aerators provide both liquid-solid mixing energy and the gas-liquor contact energy for the aeration step. In contrast to this, the FIGS. 9 and 10 subsurface-type units continuously recirculate the liquor (instead of the aeration gas) in intimate contact with the aeration gas in each compartment. Because the chamber walls and partitions confine the fluids within each compartment, surface mixers may be used in this embodiment without backmixing of the liquor thrown upward and outward of the impeller. The oxygen-depleted aeration gas disengaged from the liquor is discharged from each compartment through restricted flow conduits 23a, 23b, 23c, and 23d. These conduits may be provided with flow control valves if desired.

An advantage of the FIG. 11 apparatus is the close approach to true plug flow of liquor. The liquor velocity through restricted openings 32a–b, 32b–c and 32c–d is sufficient to prevent backmixing. The liquor in each compartment or stage is substantially uniform in composition and the BOD content progressively declines from the liquor feed stage 30a to the liquor discharge stage 30d.

Although the biomass mixed with BOD-containing water in the apparatus of FIGS. 9–11 is provided by recycling activated sludge, this is not essential to the practice of the invention. The aeration zone may in the form of a covered chamber positioned within and in open communication at its lower end with a body of BOD-containing water, e.g., a lagoon or a fermentation tank. In this event, the biomass may be circulated by natural flow and the aeration devices. In the lagoon waste treatment embodiment part of the sludge (biomass) settles to the lagoon floor and may be periodically withdrawn therefrom and removed by dredging means.

In a preferred embodiment of this method in which waste water is treated by oxygenation in contact with sludge, waste water, sludge and feed gas comprising at least 90% oxygen (by volume) are mixed in an aeration zone to form a liquor body having MLVSS of at least 3000 p.p.m. The mixing is continued while simultaneously maintaining (a) the oxygen feed gas to mixing plus gas-liquor contact energy ratio at 0.1–0.3 lb. mole oxygen per horsepower hour energy supplied, (b) the aeration gas above the liquor at oxygen partial pressure of at least 380 mm. Hg but below 65% oxygen while consuming at least 70% of the feed gas oxygen in the liquor, (c) the dissolved oxygen concentration of the liquor at below 35% of saturation with respect to the oxygen in the aeration gas, and (d) continuously recirculating aeration gas in intimate contact with the liquor in the aeration zone. Oxygenated liquor is withdrawn from the aeration zone and separated into sludge and lean effluent. At least part of the sludge is recycled to the aeration zone.

Summarizing this invention, an aeration method is provided whereby oxygen-enriched gas may be employed economically in biochemical oxidation reactions. A high percentage of the oxygen fed to the reaction is utilized while maintaining a high partial pressure of oxygen in the aeration gas. Dissolution rates are high affording dissolved oxygen levels, even with very high solids concentrations in aeration, well above those previously obtained economically. Power consumption and investment in aeration equipment are low and a heavy, fast-settling floc is produced which is not damaged during treatment.

Although certain embodiments have been described in detail, it will be appreciated that other embodiments are contemplated along with modifications of the disclosed features, as being within the scope of the invention.

What is claimed is:

1. In a method for treating BOD-containing water by oxygenation in contact with active biomass, the improvement comprising: mixing BOD-containing water, biomass and feed gas comprising at least 60% oxygen (by volume) in an aeration zone to form a liquor body and continuing said mixing while simultaneously maintaining: (a) the oxygen feed gas to mixing plus gas-liquor contact energy ratio at 0.03–0.04 lb. moles oxygen per horsepower hour of energy supplied, (b) the aeration gas above said liquor at oxygen partial pressure of at least 300 mm. Hg but below 80% oxygen while consuming at least 50% of the feed gas oxygen in said liquor, (c) the dissolved concentration of said liquor at below 70% of saturation with respect to the oxygen in said aeration gas but above about 2 p.p.m., and (d) continuously recirculating one of the aeration gas and liquor fluids in intimate contact with the other of said fluids in said aeration zone; and thereafter withdrawing oxygenated liquor from said aeration zone.

2. A method according to claim 1 in which said aeration gas is continuously withdrawn from said aeration zone and reintroduced to the body of said liquor.

3. A method according to cleam 1 in which said feed gas comprises at least 90% oxygen.

4. A method according to claim 1 in which the dissolved oxygen concentration of said liquor is maintained at below 35% of saturation.

5. A method according to claim 1 in which the oxygen partial pressure of said aeration gas is maintained above 380 mm. Hg.

6. A method according to claim 1 in which said oxygen fed gas to mixing plus gas-liquor contact energy ratio is maintained at 0.1–0.3 lb. moles oxygen per horsepower hour of energy supplied.

7. A method according to claim 1 in which the aeration gas is maintained below 65% oxygen.

8. A method according to claim 1 in which the volatile suspended solids content (MLVSS) of the liquor is at least 3000 p.p.m.

9. A method according to claim 1 in which municipal waste comprises said BOD-containing feed water, said oxygenated liquor is separated into sludge and clean effluent, and at least part of said sludge is recycled to said aeration zone as said active biomass.

10. In a method for treating municipal waste water by oxygenation in contact with sludge, the improvement comprising mechanically mixing waste water, sludge and feed gas comprising at least 90% oxygen (by volume) in an aeration zone to form a liquor body having volatile suspended solids content (MLVSS) of at least 3000 p.p.m. and continuing said mixing while simultaneously maintaining: (a) the oxygen feed gas to mixing plus gas-liquor contact energy ratio at 0.1–0.2 lb. moles oxygen per horsepower hour of energy supplied, (b) the aeration gas above said liquor at oxygen partial pressure of at least 380 mm. Hg but below 65% oxygen while consuming at least 70% of the feed gas oxygen in said liquor, (c) the dissolved oxygen concentration of said liquor at below 35% of saturation with respect to the oxygen in said aeration gas but above about 2 p.p.m., and (d) continuously recirculating aeration gas in intimate contact with said liquor in said aeration zone; withdrawing oxygenated liquor from said aeration zone and separating said oxygenated liquor into sludge and clean effluent; and recycling at least part of said sludge to said aeration zone.

References Cited

UNITED STATES PATENTS

| | | | |
|---|---|---|---|
| 1,286,017 | 11/1918 | Jones | 210—15X |
| 2,380,465 | 7/1945 | Proudman | 210—220X |
| 2,559,426 | 7/1951 | Pirnie | 210—14X |
| 3,054,602 | 9/1962 | Proudman | 210—15X |
| 3,342,727 | 9/1967 | Bringle | 210—220X |
| 3,356,609 | 12/1967 | Bruemmer | 210—7 |
| 3,401,113 | 9/1968 | Pruessner et al. | 210—15X |
| 3,412,017 | 11/1968 | Abson et al. | 210—7 |
| 3,505,213 | 5/1970 | Anthony et al. | 210—15 |

FOREIGN PATENTS

| | | | |
|---|---|---|---|
| 415,775 | 9/1934 | Great Britain | 210—220 |

OTHER REFERENCES

Grant, S., et al., The Oxygen Requirements of the Activated Sludge Process, Sewage Works Journal, vol. 2, April 1930, pp. 228–244.

Kalinske, A. A., Mechanical Air Disperser for Sewage and Waste Treatment, Biological Treatment of Sewage and Industrial Wastes, papers presented Apr. 13–15, 1955, vol. 1, Reinhold.

Budd, W. E., and Lamberth, G. F., High Purity Oxygen in Biological Sewage Treatment, Sewage and Industrial Wastes, March 1957, pp. 238–244.

Laws, R. L., and Burns, O. B., Jr., Oxygen Transfer and Power Cost with Turbine Type Equipment, proc. 14th Ind. Waste Conf., Purdue U., May 5–7, 1959, pp. 638–641.

Eckenfelder, W. W., and O'Connor, D. J., Biological Waste Treatment, Pergamon, 1961.

Pfeffer, J. T., et al., Oxygen-Enriched Air for Biological Waste Treatment, Water and Sewage Works, vol. 112, October 1965, pp. 381–384.

MICHAEL ROGERS, Primary Examiner

U.S. Cl. X.R.

210—15

UNITED STATES PATENT OFFICE
CERTIFICATE OF CORRECTION

Patent No. 3,547,812          Dated December 15, 1970

Inventor(s) John R. McWhirter

It is certified that error appears in the above-identified patent and that said Letters Patent are hereby corrected as shown below:

Disclosure:

Column 2, line 72, delete "were" and substitute -- was --

Column 8, Table B, under heading "$O_2$ consumption, percen delete "85" and substitute -- 50 --; and delete "9" and substitute -- 95 --.

Column 10, line 18, insert -- . -- after "spectively", a line 69, delete "may" and substitute -- and --.

Claims:

Column 13, line 45, claim 1, delete "0.04" and substitut -- 0.4 --; line 49, after "dissolved" insert -- oxygen --; li 60, claim 3, delete "cleam" and substitute -- claim --; line 70, claim 6, delete "fed" and substitute -- feed --.

Signed and Sealed this second Day of March 1976

[SEAL]

Attest:

RUTH C. MASON
*Attesting Officer*

C. MARSHALL DANN
*Commissioner of Patents and Trademarks*